(12) United States Patent
Mourougaya et al.

(10) Patent No.: US 11,041,783 B2
(45) Date of Patent: Jun. 22, 2021

(54) CONTROL DEVICE FOR CIVIL-ENGINEERING VEHICLE TIRE AND CORRESPONDING CONTROL METHOD

(71) Applicant: COMPAGNIE GENERALE DES ETABLISSEMENTS MICHELIN, Clermont-Ferrand (FR)

(72) Inventors: François Mourougaya, Clermont-Ferrand (FR); Julien Charlat, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 127 days.

(21) Appl. No.: 16/349,790

(22) PCT Filed: Nov. 13, 2017

(86) PCT No.: PCT/IB2017/057080
§ 371 (c)(1),
(2) Date: May 14, 2019

(87) PCT Pub. No.: WO2018/087726
PCT Pub. Date: May 17, 2018

(65) Prior Publication Data
US 2019/0360896 A1 Nov. 28, 2019

(30) Foreign Application Priority Data
Nov. 14, 2016 (FR) ........................................ 1670680

(51) Int. Cl.
*G01M 17/02* (2006.01)
*G01N 29/22* (2006.01)
*G01N 29/265* (2006.01)

(52) U.S. Cl.
CPC ........ *G01M 17/025* (2013.01); *G01N 29/225* (2013.01); *G01N 29/265* (2013.01);
(Continued)

(58) Field of Classification Search
CPC . G01M 17/025; G01N 29/225; G01N 29/265; G01N 2291/044; G01N 2291/2692
(Continued)

(56) References Cited

U.S. PATENT DOCUMENTS 3,507,308 A * 4/1970 White ................ G01N 29/2493
141/7
3,882,717 A * 5/1975 McCauley ............. G01N 29/27
73/600

(Continued)

FOREIGN PATENT DOCUMENTS

GB          665153          1/1952

OTHER PUBLICATIONS

International Search Report dated Jan. 31, 2018, in corresponding PCT/IB2017/057080 (4 pages).

*Primary Examiner* — Tarun Sinha
(74) *Attorney, Agent, or Firm* — Venable LLP

(57) ABSTRACT

A device for inspecting tires of large dimensions, in particular for civil engineering vehicles, comprises: a rotationally driven tire support (10) designed to support a tire (20) to be inspected in position so that its axis of rotation is substantially horizontal, said support comprising means for rotating the supported tire; an ultrasound inspection device (1) provided with an inspection head (5) that is freely mounted radially and axially, a module (8) for retrieving and processing echo data retrieved during inspection phases, and a system for controlling the movement of the inspection head (5) inside the tire to be inspected, in particular along the inner wall of the crown area of said tire to be inspected.

12 Claims, 1 Drawing Sheet

(52) U.S. Cl.
CPC .............. *G01N 2291/044* (2013.01); *G01N 2291/2692* (2013.01)

(58) Field of Classification Search
USPC .......................... 73/540, 584, 587, 597, 602
See application file for complete search history.

(56) References Cited

U.S. PATENT DOCUMENTS

| | | | |
|---|---|---|---|
| 5,095,744 A * | 3/1992 | Macecek | G01M 17/025 73/146 |
| 6,571,636 B1 * | 6/2003 | McWhorter | G01N 29/2493 73/636 |
| 9,903,791 B2 | 2/2018 | Charlat et al. | |
| 9,976,937 B2 | 5/2018 | Charlat et al. | |

* cited by examiner

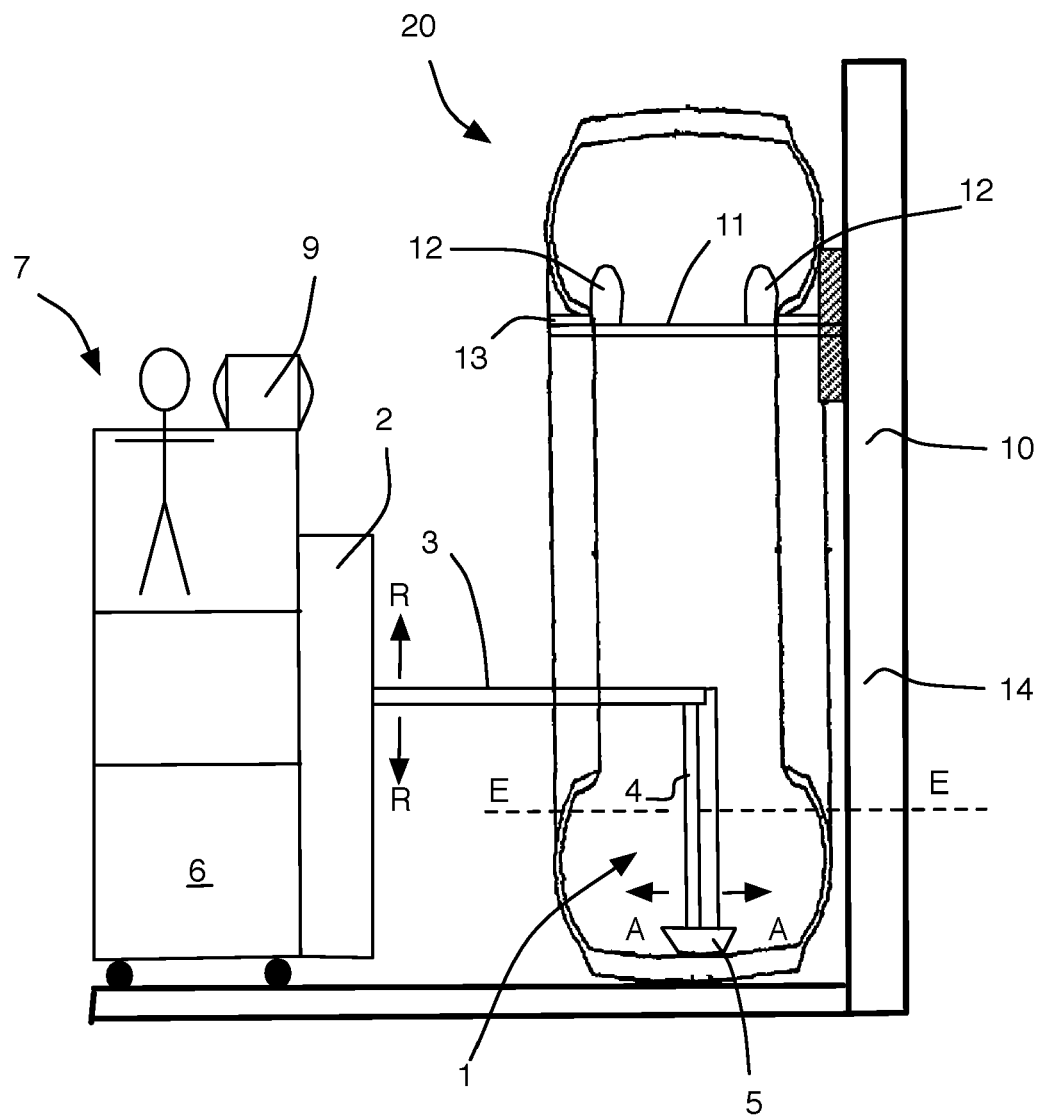

CONTROL DEVICE FOR CIVIL-ENGINEERING VEHICLE TIRE AND CORRESPONDING CONTROL METHOD

TECHNICAL FIELD OF THE INVENTION

The present invention relates to a device for inspecting tyres of large dimensions, in particular for civil engineering vehicles, comprising a tyre support designed to support a tyre to be inspected and an inspection module. It further relates to a method for inspecting tyres.

PRIOR ART

The tyres for civil engineering vehicles are conventionally very large dimensions, for example, 58 to 63 inches. These tyres are very heavy and bulky and are therefore very difficult to handle. The qualities and the integrity of these tyres are subject to highly stringent and thorough inspections. For example, X-ray techniques are used to inspect the internal reinforcers, which are invisible to the naked eye. More specifically, the intention is to determine the relative positions of the metal cords forming the carcass ply of a civil engineering tyre.

These inspection techniques, which involve the use of X-rays, the use of which must be strictly regulated and monitored, is not devoid of a number of problems. The costs incurred by these systems and the required management are also particularly high. Furthermore, the X-ray inspection devices are not easy to transport. Finally, they cannot be used on the sites of operation of the civil engineering vehicles.

In order to overcome these various disadvantages, the invention provides various technical means.

SUMMARY OF THE INVENTION

Firstly, a first aim of the invention involves providing a device for inspecting large tyres that allows the integrity of the reinforcer cords to be checked without using X-rays.

Another aim of the invention involves providing a device for inspecting tyres that can be used in a factory or on a site where the tyres are used, for example, a mine located in a remote region.

A still further aim of the invention involves providing a method for inspecting tyres that operates without X-rays.

To this end, the invention provides a device for inspecting tyres of large dimensions (preferably larger than 55 inches), in particular for civil engineering vehicles, comprising:

a rotationally driven tyre support designed to support a tyre to be inspected in position so that its axis of rotation is substantially horizontal, said support comprising means for rotating the supported tyre;

an ultrasound inspection device provided with an inspection head that is freely mounted radially and axially, a module for retrieving and processing echo data retrieved during inspection phases, and a system (manual or automatic) for controlling the movement of the inspection head inside the tyre to be inspected, in particular along the inner wall of the crown area of said tyre to be inspected.

This type of device allows effective inspections to be performed either on targeted surfaces or on the entirety of the surfaces covering the cords. The absence of X-rays improves the operational safety conditions for the operators. The equipment can be transported, for example, to a civil engineering vehicle user.

Furthermore, the ultrasound inspection device requires the presence of an ultrasound fluid. It is known, in some solutions of the prior art, for the tyre to be fully immersed in such a fluid. In a device according to the invention, the fluid is placed in the vertically suspended tyre, which allows the amount of fluid and the operating cost to be considerably reduced. The configuration with the tyre "upright" allows the required ground surface area to be considerably reduced compared to the current solution, in which the tyre is placed on one of its sidewalls.

According to an advantageous embodiment, the module for retrieving and processing echo data comprises a signal processing sub-module allowing real-time display of the retrieved echo signals. An operator can then perform a visual inspection in real-time.

Advantageously, the module for retrieving and processing echo data comprises a signal processing sub-module for recording the echo data. The storage of data can be used for traceability purposes and/or for subsequent consultation or post-processing of the data.

According to another advantageous embodiment, the device further comprises a pump for ensuring the filling of carrier fluid and/or for draining this fluid in the lower area of the tyre cavity. Preferably, a limit is used for the fluid level under the axis E-E, in order to avoid any overflowing during rotation of the tyre and movements of the head. The water substantially remains in the lower area despite the rotation of the tyre due to the gravitational force.

Advantageously, the rotary support comprises a transverse arm supporting two roller bearings, on which the sidewalls of the tyre are placed during an inspection.

The invention also provides a method for inspecting tyres of large dimensions (for example, larger than 55 inches), in particular for civil engineering vehicles, comprising the following steps:

placing a tyre to be inspected on a rotationally driven tyre support designed to support the tyre to be inspected in position so that its axis of rotation is substantially horizontal;

filling the lower area of the tyre cavity using an ultrasound fluid;

positioning an inspection head inside the tyre cavity, in the immersed area, in the immediate vicinity of the surface to be inspected;

rotating the tyre at a speed that is adapted to the applied waves using a support comprising means for rotating the supported tyre;

applying the ultrasound and retrieving the generated echo signals using the movable inspection head of the ultrasound device.

The applied angular speed is designed to comply with the spatial resolution compatible with the dimension and the spacing of the cords forming the tyre casing. The speed is such that the sound wave has enough time to complete a round trip by means of the carrier fluid allowing the waves to be transmitted between the head and the surface to be inspected. The sensors are controlled in order to reconstitute an image representing a fraction of the carcass ply of the tyre. The retrieved data can be processed in real-time or retrospectively by signal processing software. Handling tools are advantageously used to install and remove the tyre.

Advantageously, following the passage of the inspection head on a first circumferential sector of the tyre, said head successively performs a plurality of axial movements, to allow the head to pass over a plurality of sectors to be inspected.

The method advantageously comprises a phase of displaying echo data received by the ultrasound head. The display allows an experienced operator to determine the conformity of the tyre that is the subject of the inspection.

Advantageously, the method further comprises a phase of processing echo data received by the ultrasound head. For example, an interpreter module can be used in order to transition from the time domain to the space domain.

Also advantageously, the method further comprises a phase of recording echo data received by the ultrasound head.

DESCRIPTION OF THE FIGURES

All the embodiments are provided in the following description, accompanied by the single FIGURE, which description is provided solely for the purposes of non-limiting examples, and in which:

FIG. 1 is a schematic representation of a tyre inspection device with a vertical tower, on which a tyre to be inspected is placed and mounted as a transverse section.

DETAILED DESCRIPTION OF THE INVENTION

As shown in FIG. 1, the ultrasound inspection device comprises a rotary support 10 formed by a vertical tower 14, the height of which is advantageously designed to substantially correspond to that of the tyres 20 to be inspected. By way of a variation, a wall can act as a tower. In the upper portion of the tower, a substantially horizontal transverse arm 11 extends from the tower over a length substantially corresponding to the width of the tyres 20 to be inspected. This arm supports at least one stop 12, and preferably two stops, as shown in FIG. 1. The stops 12 guarantee the axial position of the tyre 20, particularly during its rotation. The stops 12 are arranged to press against each tyre bead from the tyre cavity. Between the seats of the tyre beads and the transverse arm 11, roller bearings 13 allow the tyre that is supported by the support 10 to be rotated. The motor and the transmission elements enabling the rotation of the roller bearings are of a type that is per se known and are not shown so as to avoid unnecessarily complicating the diagram. Handling means, which are also per se known, allow the tyres 20 to be installed on and removed from the support 10.

An ultrasound inspection module 1 forms the part intended for implementing ultrasound and for retrieving corresponding echo data.

An inspection head 5 that is freely mounted axially (for movements over the width of the tyre) and radially (for providing a path between an insertion position above the sidewall and an inspection position, with the head 5 lowered against the inner wall to be inspected). This latter position is shown in FIG. 1. Various types of inspection head can be used, which can be formed by one or more linearly arranged transceiver element(s). For example, a head is used that is provided with three multi-element ultrasound probes with thirty-two elements, controlled by a multiplexer connected to the management module 8.

The positioning and the movement of the inspection head 5 can be provided in many ways, such as, for example, using telescopic, or slidably mounted, arms 3 and 4, as in the example of FIG. 1. The arrows R-R and A-A of FIG. 1 respectively show the movements in the radial and axial directions. A movement control module 2 supports the axial arm 3 and provides the kinematic chain up to the inspection head 5. A management module 8, which is provided, for example, in the movement control module 2, allows management of the generation of the waves and the echo data that is received in return.

To ensure the transmissibility of the waves from the head to the surface to be inspected, and vice versa, an ultrasound transmission fluid is used. The substantially vertical position of the tyre allows the lower area of the tyre cavity to be filled with a sufficient amount of fluid to allow the head to move without any fluid escaping. The line E-E indicates the desired filling limit to avoid any overflowing of fluid. This upper limit is provided to avoid any fluid from overflowing out of the cavity during inspection phases. By virtue of the ultrasound transmission fluid, the head 5 is immersed in order to complete the inspection phases.

In the example of FIG. 1, the movement control module 2 and the management module 8 are arranged in an inspection tower 6, on which an operator 7 can be located in order to provide better final management of the operations. An inspection screen 9 is advantageously provided to allow the operator 7 to view the echoes originating from the inspection head and to assess the conformity of the tyre.

The system operates as follows: the tyre to be inspected is placed on the transverse arm 11 using a forklift truck or other handling means. The coupling fluid is placed in the area to be measured, for example, using a pump (not shown). The coupling fluid advantageously is water.

The inspection head 5 is placed in the immersed inspection area, against the surface to be inspected. The tyre is rotated. The rotation speed is such that it complies with the spatial resolution compatible with the dimension and the spacing of the cords forming the tyre casing. The speed is also such that the sound wave has enough time to perform a round trip in the fluid.

The sensors are controlled so that the operator is able to reconstitute an image representing a fraction of the carcass ply. The display allows an experienced operator to determine the conformity of the carcass ply. The data still can be processed in real-time or retrospectively by signal processing software. An encoder advantageously can be used in order to transition from the time domain to the space domain.

In order to optimize the transmissibility of the waves, sensors measure the position of the inspection head and an adjustment means, for example, a mechanical suspension system (tyre), keeps the head perpendicular relative to the surface of the tyre.

The system and the method according to the invention advantageously allow two types of inspection: an inspection producing images of sections of the products forming the tyre, or an inspection producing images of circumferential tracks at a given depth.

The proposed device allows inspection of casings carcasses of heavy tyres with large dimensions, in particular for civil engineering vehicles, typically with dimensions of 58 inches to 63 inches, without these dimensions being considered in a limiting manner.

REFERENCE NUMBERS USED IN THE FIGURES

1 Inspection module
2 Control module
3 Axial arm
4 Radial arm
5 Inspection head
6 Inspection tower
7 Operator 8 Management module
9 Screen
10 Rotary support
11 Transverse arm
12 Stops
13 Roller bearings
14 Support tower
20 Tyre
21 Inspection area

The invention claimed is:

1. A tire inspection device for inspecting tires of large dimensions comprising:
 a rotationally driven tire support configured to support a tire to be inspected in position so that the axis of rotation of the tire to be inspected is substantially horizontal, the rotationally driven tire support comprising means for rotating the tire to be inspected; and
 an ultrasound inspection module provided with:
  an inspection head that is freely mounted radially and axially,
  a module for retrieving and processing echo data retrieved during inspection phases, and
  a module for controlling movement of the inspection head inside the tire to be inspected,
 wherein the tire inspection device further comprises a pump for ensuring the filling and the draining of an ultrasound fluid in a lower area of a tire cavity such that the inspection head is immersed in the ultrasound fluid during the inspection phases with a sufficient amount of ultrasound fluid to allow the inspection head to move in the ultrasound fluid and with a filling limit to avoid overflowing of the ultrasound fluid from the lower area of the tire cavity.

2. The tire inspection device according to claim 1, wherein the tires of large dimensions are civil engineering vehicle tires.

3. The tire inspection device according to claim 1, wherein the movement of the inspection head inside the tire is movement along an inner wall of a crown area of the tire to be inspected.

4. The tire inspection device according to claim 1, wherein the module for retrieving and processing echo data comprises a signal processing sub-module allowing real-time display of the retrieved echo signals.

5. The tire inspection device according to claim 1, wherein the module for retrieving and processing echo data comprises a signal processing sub-module for recording the echo data.

6. The tire inspection device according to claim 1, wherein the rotationally driven tire support comprises a transverse arm supporting two roller bearings, on which the sidewalls of a tire to be inspected are placed during an inspection.

7. A method for inspecting tires of large dimensions comprising the following steps:
 placing a tire to be inspected on a rotationally driven tire support designed to support the tire to be inspected in position so that the axis of rotation of the tire to be inspected is substantially horizontal;
 filling a lower area of a tire cavity using an ultrasound fluid in order to complete inspection phases with a movable inspection head immersed in the ultrasound fluid with a sufficient amount of fluid to allow the movable inspection head to move in the ultrasound fluid and with a filling limit to avoid any overflowing of ultrasound fluid from the lower area of the tire cavity;
 positioning the movable inspection head inside the tire cavity, in the immersed area, in the immediate vicinity of the surface to be inspected;
 rotating the tire at a speed that is adapted to the applied waves using the rotationally driven tire support; and
 applying ultrasound waves and retrieving the generated echo signals using the movable inspection head.

8. The method according to claim 7, wherein the tires of large dimensions are civil engineering vehicle tires.

9. The method according to claim 7, wherein, following passage of the movable inspection head on a first circumferential sector of the tire, the movable inspection head successively performs a plurality of axial movements to allow the movable inspection head to pass over a plurality of sectors to be inspected.

10. The method according to claim 7, further comprising a step of displaying echo data.

11. The method according to claim 7, further comprising a step of processing echo data.

12. The method according to claim 7, further comprising a step of recording echo data.

* * * * *